United States Patent Office 3,511,890
Patented May 12, 1970

3,511,890
OLEFIN CONVERSION AND CATALYST
THEREFOR
Robert E. Reusser, Bartlesville, Okla., assignor to Phillips Petroleum Company, a corporation of Delaware
No Drawing. Filed Mar. 3, 1966, Ser. No. 531,333
Int. Cl. C07c 3/62, 13/00; B01j 11/82
U.S. Cl. 260—683
10 Claims

ABSTRACT OF THE DISCLOSURE

Olefins are converted into olefins of different molecular weight by contact with a catalyst prepared from a normal salt of phosphomolybdic acid and a solid support.

---

This invention relates to the conversion of olefin hydrocarbons and to a catalyst for such conversion. In one aspect this invention relates to the disproportionation of an olefin. In another aspect it relates to the conversion of internal olefins to terminal olefins. In still another aspect it relates to the conversion of cyclic olefins to cyclic polyunsaturated hydrocarbons of higher molecular weight. A further aspect of the invention relates to the conversion of cyclic olefins to acyclic diolefins.

Disproportionation according to this invention can be defined as the conversion of a hydrocarbon into similar hydrocarbons of both higher and lower number of carbon atoms. For example, when propylene is disproportionated approximately equimolar quantities of ethylene and butenes are produced. Ethylene and butenes are often in short supply whereas propylene is usually available in quantity.

A number of processes are available for the synthesis of olefins such as dehydrogenation, halogenation followed by dehydrohalogenation and the like. By such processes internal olefins, that is olefins having no terminal double bonds, are available in large quantities while terminal olefins are relatively scarce. Terminal olefins are useful in many processes such as hydration to form alcohols, alkylation of aromatics to form biodegradable detergent alkylates, polymerization and other uses, including some for which internal olefins are of little value.

It is therefore an object of this invention to provide a method for the conversion of olefins. Another object is to provide a catalyst for the conversion of olefins. Still another object of this invention is to provide a method for converting olefins to similar olefins of higher and lower numbers of carbon atoms. Still another object of this invention is to provide a method for producing polyunsaturated cyclic hydrocarbons. Still another object is to provide a method for the conversion of cyclic olefins to acyclic diolefins. Other aspects, objects and advantages of my invention will be apparent to one skilled in the art upon reading the disclosure including the detained description of the invention.

According to the process of this invention acyclic olefins of at least 3 carbon atoms are disproportionated; internal olefins are reacted with terminal olefins; or cyclic olefins are reacted with cyclic or acyclic olefins by contacting the olefins under appropriate reacting conditions, including conditions of temperature and residence time, with a catalyst prepared by treating a catalyst support with an alkali metal salt, ammonium salt, an alkaline earth metal salt or the bismuth salt of phosphomolybdic acid. According to the invention the reaction of two molecules of octene-1, for example, yields one molecule of 7-tetradecene and one molecule of ethylene as primary products. The reaction of octene-2 with ethylene yields one molecule of 1-heptene and one molecule of propylene. The reaction of two molecules of propylene yields one molecule of butene-2 and one molecule of ethylene. The reaction of cyclohexene with ethylene results in the formation of 1,7-octadiene. The conversion of two molecules of cyclopentene according to the process of this invention yields 1,6-cyclodecadiene as a primary product. The primary products can, of course, also undergo further conversion in some circumstances.

Olefins applicable for the invention are acyclic monoolefins having from 3 to 30 carbon atoms per molecule; cyclic olefins having from 4 to 20 carbon atoms per molecule; mixtures of the above olefins; and mixtures of ethylene and the above olefins.

Some specific examples of acyclic monoolefins are propylene; 1-butene; 2-butene; isobutene; 1-pentene; 2-pentene; 1-hexene; 2-heptene; 1-octene; 2-nonene; 1-dodecene; 2-tetradecene; 1-hexadecene; 2-methyl-1-butene; 2-methyl-2-butene; 3-methyl-1-butene; 1-triacontene; and 3-heptene.

The cyclic olefin compounds which are applicable in the process of this invention are those having from 4 to about 12 carbon atoms in the ring, from 1 to 4 nonconjugated double bonds in the ring, and 0 to 10 substituent alkyl groups each containing from 1 to about 4 carbon atoms, such that the total number of carbon atoms per molecule does not exceed 20.

Some specific examples of the above cyclic compounds are cyclobutene, cyclopentene, cyclohexene, 3-methylcyclopentene, 4-ethylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like.

The catalysts which are employed in the process of this invention are composite catalysts which have been formed by the admixture of a normal salt of phosphomolybdic acid with a solid support. The supports which can be employed are alumina, silica, silica-alumina, and combinations of these which can also contain small amounts of other materials which do not significantly impair the function of the catalyst such as magnesia, titania, and the like. The salt of phosphomolybdic acid can be applied to the support in a variety of ways, including such methods as impregnation, coprecipitation, and the like. The salts of phosphomolybdic acid which can be employed are the ammonium, sodium, potassium, lithium, rubidium, cesium, calcium, magnesium, strontium, bismuth, and barium phosphomolybdates. The amount of phosphomolybdate on the support can vary over a wide range, but will generally be within the range of about 0.1 to 30 percent by weight of the total composite. Preferably, the phosphomolybdate will comprise about 1 to 15 percent by weight of the catalyst composite.

If desired, the catalyst, prior to activation, can be given a base treatment by treating the catalyst with an alkali metal, or alkaline earth metal hydroxide or halide by impregnation procedure similar to that of impregnating the catalyst support with the salt of phosphomolybdic acid employing an aqueous solution containing from 0.01 to about 2 weight percent of the metal compound based on the weight of the catalyst.

Activation of the phosphomolybdate-containing catalyst can be effected by heating to a temperature above 260° C., preferably at a temperature of from about 400 to about 800° C., under air, generally for at least 5 minutes, preferably 0.5 to 25 hours. Regardless of the particular phosphomolybdate being employed, and regardless of the activation method employed, it is appropriate to utilize a support having a surface area of about 100 to about 300 m.$^2$/g. or higher. Spent catalysts can be regenerated by a similar calcination technique using air or diluted air to restore the activity of the catalyst.

After the improved catalyst of this invention is formed, the catalyst is utilized by contacting the appropriate olefin or mixture of olefins with said catalyst. The temperature at which the contacting of the olefin with the catalyst occurs will generally range from 25 to 300° C., preferably from 75 to 200° C. for from about ½ second to 10 hours or higher. The conversion will generally be maintained below 50 percent to minimize formation of by-products. The use of the metal compound-treated catalyst of this invention frequently provides a means for greatly reducing the amount of by-products formed as compared to the non-base treated catalyst.

The process can be carried out in the presence or absence of an inert diluent. Generally, the amount of diluent present can range from 0 to 90 percent by volume of the reaction mixture. Suitable diluents include saturated hydrocarbons such as alkanes and cycloalkanes and mixtures thereof. The particular diluent should be chosen on the basis of the boiling point of the charged olefins and the expected products as compared to the boiling point of the diluent, so as to simplify recovery procedures.

The process of this invention can be carried out batchwise or as a continuous process. In a batch process, the catalyst will generally comprise from about 0.5 to about 25 percent by weight of the reaction mixture. When operating on a continuous basis, the catalyst can be employed as a fixed bed over which olefin feed stock and recycle is passed at a suitable rate to obtain the desired conversion at the chosen reaction conditions.

One convenient method for utilizing the catalyst in a fixed bed type operation is to employ the catalyst as a bed located above the kettle of a distillation column. Boiling of the charged olefin or olefin mixture from the kettle brings the olefins into contact with the catalyst, which results in the conversion of the olefins to different olefins. Such an operation is particularly suitable for conversion of a single olefin into one olefin of a higher molecular weight and one of lower molecular weight than the charged olefin. The light olefin will be distilled out the top of the column, while the heavy olefin will reflux to the kettle.

When olefin mixtures are charged, the mol ratio of olefins can vary over a wide range. For example, when two olefins (A and B) are charged, the mol ratio of $A/B$ can vary over a range of from 1/20 to 20/1 or even higher, and lower if desired.

The following specific examples are intended to illustrate the advantages of the process of this invention, but it is not intended that they be limited to the specific features shown in these examples.

EXAMPLE I

A run was carried out in which octene-2 and ethylene were reacted together to form a mixture of different olefins according to the process of this invention.

In this run, an ammonium phosphomolybdate-promoted alumina was employed, and this catalyst was prepared in the following manner. Approximately 10 grams of ammonium phosphomolybdate was dissolved in 75 ml. of concentrated ammonium hydroxide (28 weight percent), and to this solution was added 70 grams of alumina pellets. The resulting mixture was then evaporated to dryness, after which the pellets were activated by heating at 1000° F. for 5 hours in air.

Approximately 25 grams of the above-prepared phosphomolybdate-promoted alumina pellets were packed into a tube type reactor and heated to 125° C. Twenty ml. of octene-2 and sufficient ethylene to provide a 4/1 molar ratio of ethylene/octene-2 were then passed through this catalyst bed in about 5 minutes and the resulting mixture of olefins was trapped in a Dry Ice trap. The mixture of olefins obtained was analyzed by gas-liquid chromatography (GLC) using a 20-foot polyphenylether column. The results of this analysis are given below:

CHROMATOGRAPHIC ANALYSIS

| Olefin: | Weight percent |
| --- | --- |
| $C_3$ | 0.29 |
| $C_4$ | 1.28 |
| $C_5$ | 1.76 |
| $C_6$ | 2.69 |
| $C_7$ | 3.48 |
| $C_8$ | [1] 87.68 |
| $C_9$ | 1.21 |
| $C_{10}$ | 0.78 |
| $C_{11}$ | 0.42 |
| $C_{12}$ | 0.33 |
| $C_{13}$ | 0.08 |

[1] Starting material.

The data in the above table show that the ammonium phosphomolybdate was effective for converting the mixture of ethylene and octene-2 feed. Heptene-1 and other olefins having both a larger and a smaller number of carbon atoms per molecule than that of the octene feed were formed.

EXAMPLE II

Ten grams of ammonium phosphomolybdate was dissolved in 50 ml. of water and about 10 ml. of $NH_4OH$. In another beaker 2.6 grams of $Bi(NO_3)_3 \cdot 5H_2O$, 25 ml. water, and 5 ml. of concentrated $HNO_3$ were stirred until all the solids were dissolved. The ammonium phosphomolybdate solution was then used to impregnate 100 grams of alumina pellets, placing the mixture under temporary evacuation to improve penetration of the liquid into the pores of the alumina. The bismuth-containing solution was then added to the mixture and an immediate yellow precipitate was observed. The mixture was dried over a steam bath at reduced pressure and the yellow pellets were then heated at 1000° F. for 4 hours in the presence of air.

A 10 ml. quantity of the above prepared and activated catalyst was charged into a distillation column mounted on a distillation pot which contained 30 ml. of octene-1. The pot was heated for 2 hours 10 minutes such that the contents refluxed over the catalytic bed during which time the pot temperature rose from 121 to 176° C.

Analysis of the resulting reaction mixture (excluding the octene-1 feed) is shown in the following table.

| Olefin: | Mol percent |
| --- | --- |
| $C_3$ | 1.89 |
| $C_4$ | 0.24 |
| $C_5$ | 1.08 |
| $C_6$ | 1.57 |
| $C_7$ | 4.84 |
| $C_8$ | — |
| $C_9$ | 23.76 |
| $C_{10}$ | 5.42 |
| $C_{11}$ | 5.39 |
| $C_{12}$ | 10.41 |
| $C_{13}$ | 19.89 |
| $C_{14}$ | 24.06 |

The data show that the bismuth phosphomolybdate on alumina catalyst was effective in converting octene-1 to other olefins of both higher and lower molecular weight. Ethylene (and perhaps some propylene) was not recovered and measured in this test but it was also a significant disproportionation product. The conversion of octene-1 in this run was 78.49 percent.

That which is claimed is:

1. A process for converting an olefin into an olefin of different molecular weight which comprises contacting an acyclic monoolefin containing from 3 to 30 carbon atoms per molecule, a mixture of said olefins, or a mixture of at least one of said olefins and ethylene with a catalyst comprising a heat activated admixture of a solid support and a compound selected from the group consisting of ammonium phosphomolybdate, sodium phosphomolybdate, potassium phosphomolybdate, lithium phosphomolybdate, rubidium phosphomolybdate, cesium phosphomolybdate, calcium phosphomolybdate, magnesium phosphomolybdate, strontium phosphomolybdate, bismuth phosphomolybdate and barium phosphomolybdate at reaction conditions including conditions of temperature in the range of 75–200° C. and residence time suitable to obtain the desired conversion.

2. The process of claim 1 wherein the residence time is about 0.5 second to 10 hours.

3. The process of claim 1 wherein the catalyst is heated in air at a temperature in the range of about 400 to 800° C. for at least about 5 minutes prior to contact with the olefin.

4. The process of claim 1 wherein said compound is ammonium phosphomolybdate.

5. The process of claim 1 wherein the olefin is a mixture of octene-2 and ethylene, the catalyst is prepared by impregnating alumina pellets with about 0.1 to 30 weight percent of ammonium phosphomolybdate, the prepared catalyst is heated in air for about 5 hours at about 540° C., and the olefin mixture is contacted with the catalyst at about 125° C.

6. The process of claim 1 wherein a mixture of an internal olefin having from 4 to 30 carbon atoms and ethylene is contacted with said catalyst to produce a 1-olefin.

7. The process of claim 3 wherein the olefin is octene-1, and the catalyst is prepared by impregnating alumina pellets with ammonium phosphomolybdate and adding a bismuth-containing solution.

8. The process of claim 1 wherein said solid support is selected from alumina, silica, silica-alumina and combinations thereof.

9. A catalyst suitable for converting olefins which is prepared by impregnating a catalyst support with ammonium phosphomolybdate and activating the catalyst at a temperature of about 400 to 800° C. for at least about 5 minutes.

10. The catalyst of claim 9 wherein the support is alumina, silica, silica-alumina or combinations thereof.

References Cited

UNITED STATES PATENTS

| | | | |
|---|---|---|---|
| 2,301,966 | 11/1942 | Michel et al. | 260—683.15 |
| 2,798,889 | 7/1957 | Waterman et al. | 260—673 |
| 2,798,890 | 7/1957 | Waterman et al. | 260—673 |
| 3,347,902 | 10/1967 | Grasselli et al. | 252—467 |

DELBERT E. GANTZ, Primary Examiner

CHARLES E. SPRESSER, Jr., Assistant Examiner

U.S. Cl. X.R.

252—437, 467; 260—666